United States Patent
Lee et al.

(10) Patent No.: US 8,227,988 B2
(45) Date of Patent: Jul. 24, 2012

(54) MATERIAL FOR FORMING BARRIER RIBS, BARRIER RIBS FORMED USING THE MATERIAL AND PDP COMPRISING THE BARRIER RIBS

(75) Inventors: Beom-Wook Lee, Suwon-si (KR);
Jong-Seo Choi, Suwon-si (KR);
Kwi-Seok Choi, Suwon-si (KR);
Myung-Duk Lim, Suwon-si (KR);
Bum-Jin Chang, Suwon-si (KR);
Jong-Hee Hwang, Seoul (KR)

(73) Assignee: Samsung SDI Co., Ltd (KR)

( * ) Notice: Subject to any disclaimer, the term of this patent is extended or adjusted under 35 U.S.C. 154(b) by 183 days.

(21) Appl. No.: 12/557,350

(22) Filed: Sep. 10, 2009

(65) Prior Publication Data

US 2010/0060162 A1    Mar. 11, 2010

Related U.S. Application Data

(60) Provisional application No. 61/096,251, filed on Sep. 11, 2008.

(51) Int. Cl.
*H01J 1/62* (2006.01)
(52) U.S. Cl. .................................. 313/586; 313/582
(58) Field of Classification Search .................. 313/582, 313/586, 292; 501/17, 24
See application file for complete search history.

(56) References Cited

U.S. PATENT DOCUMENTS

| 4,309,485 A | 1/1982 | Kondo et al. |
| 5,714,840 A | 2/1998 | Tanabe et al. |
| 5,993,974 A | 11/1999 | Fukushima et al. |
| 6,287,995 B1 | 9/2001 | Lee |
| 7,105,256 B2 * | 9/2006 | Fukushima ............... 430/9 |
| 2009/0039758 A1 | 2/2009 | Fechner et al. |

FOREIGN PATENT DOCUMENTS

| DE | 10 2007 026 029 A1 | 12/2008 |
| GB | 1205652 | 9/1970 |
| JP | 3-83836 A | 4/1991 |
| JP | 08-310631 A | 11/1996 |

(Continued)

OTHER PUBLICATIONS

Office Action issued by the Korean Industrial Property Office dated Apr. 27, 2011 in Korean Patent Application No. 10-2009-0085871.

(Continued)

*Primary Examiner* — Vip Patel
(74) *Attorney, Agent, or Firm* — Knobbe Martens Olson & Bear LLP

(57) ABSTRACT

Provided is a material for forming barrier ribs, barrier ribs formed using the material, and a PDP comprising the barrier ribs. The material is photosensitive and made from a glass frit composition which is environmentally friendly (no Pb or Bi) and also prevents light scattering. The primary component of the glass frit is $P_2O_5$. Other components can be included in the barrier rib forming material such as an alkali-based metal oxide, $B_2O_3$, $SiO_2$, etc. The barrier rib formed of the glass frit can additionally include a photosensitive organic material which may include a crosslinking agent, a polyfunctional monomer or oligomer, a photo initiator, a binder and an additive. A method of forming the barrier ribs comprising the glass frit composition is also provided as is a PDP including such barrier ribs.

17 Claims, 4 Drawing Sheets

FOREIGN PATENT DOCUMENTS

| | | |
|---|---|---|
| JP | 11-139847 A | 5/1999 |
| JP | 2001-261368 | 9/2001 |
| JP | 2001-261369 | 9/2001 |
| JP | 2004-087421 | 3/2004 |
| JP | 2005-053443 A | 3/2005 |
| KR | 10-2005-0028543 A | 3/2005 |
| KR | 10-2007-0039452 A | 4/2007 |

OTHER PUBLICATIONS

Kuznetsov A I, Medvedeva G V and Spiridomov V A, Glass for soldering to metal—contains oxide(s) of silicor, aluminium, barium, sodium, lithium, zinc, copper and cobalt used in electronics etc., Database Record, 1979, 1 page, Database WPI Week 198148 Thomson Scientific, London, GB.

Backalin Y U I, Fedorova L S and Tsatskin A Am, Glass for metal coating—comprises oxide(s) of barium, strontium, tin zinc lanthanum aluminium bismuth molybdenum beryllium and phosphorus, Database Record, 1985, 1 pages, Database WPI Week 198743 Thomson Scientific, London, GB.

Extended European Search Report issued by the European Patent Office dated Jan. 29, 2010, 4 pages.

Japanese Office Action dated Nov. 29, 2011, 2 pages.

\* cited by examiner

MATERIAL FOR FORMING BARRIER RIBS, BARRIER RIBS FORMED USING THE MATERIAL AND PDP COMPRISING THE BARRIER RIBS

CROSS-REFERENCE TO RELATED PATENT APPLICATIONS

This application claims the benefit of U.S. Provisional Patent Application No. 61/096,251, filed on Sep. 11, 2008, in the USPTO, the disclosure of which is incorporated herein in its entirety by reference.

BACKGROUND

Description of the Related Art

Examples of a currently available method of forming barrier ribs of a PDP include a sandblast method, a chemical etching method, and a photolithographic process. These methods are performed together with various techniques for developing various barrier-rib structures to obtain high-quality image, simplifying the manufacturing process and decreasing manufacturing costs, and reducing wastes.

For the photolithographic process, before a dielectric layer paste is sintered, the paste for forming barrier ribs is applied and exposure and development processes are performed on the paste for forming barrier-ribs, and then the dielectric layer paste and the developed paste for forming barrier ribs are simultaneously sintered. Meanwhile, for the sandblast method and the chemical etching method, the dielectric layer is sintered before the paste for forming barrier ribs is etched. This is due to the fact that, in the sandblast method and the chemical etching method, the etching the paste for forming barrier-ribs may damage the dielectric layer. A substrate or an electrode which has been formed before the dielectric layer paste and the paste for forming barrier ribs are applied may be deformed or damaged due to the heat. Accordingly, to prevent such deformation and damage, the number of sintering processes should be minimized. Due to these reasons, the photolithographic process is favored over the sandblast method and the chemical etching method. The photolithographic process is simple and can be used to form immobilized barrier ribs.

Since photosensitive barrier ribs are formed through an exposure process, the paste for forming barrier ribs may consist of materials having a refractive index similar to that of a photosensitive organic material. If glass frit, which forms the paste for forming barrier rib, has different refractive index from the photosensitive organic material, an undesired region may be exposed to the refracted light.

The present embodiments overcome the above problems in the related art and provides additional advantages as well.

SUMMARY

Some embodiments relate to a glass frit composition comprising $P_2O_5$ in an amount from about 40 to about 70 parts by weight, BaO, SrO or a mixture thereof in an amount from about 1 to about 20 parts by weight, ZnO in an amount from about 1 to about 30 parts by weight and $Al_2O_3$ in an amount from about 1 to about 15 parts by weight.

In some embodiments, the average light refractive index of the composition is from about 1.5 to about 1.6.

In some embodiments, the glass frit is a composition for forming a photosensitive barrier rib.

In some embodiments, the composition is substantially free of Pb or Bi.

Some embodiments further comprise an alkali-based metal oxide selected from the group consisting of $Li_2O$, $Na_2O$ and $K_2O$, wherein the alkali-based metal oxide is 3 parts by weight or less.

In some embodiments, the composition further comprises $B_2O_3$ in an amount from about 1 to about 15 parts by weight.

In some embodiments, the composition further comprises $SiO_2$ in an amount about 5 parts by weight or less.

In some embodiments, the thermal expansion coefficient of the composition is from about $70\times10^{-7}/°$ C. to about $85\times10^{-7}/°$ C.

Some embodiments relate to a photosensitive barrier rib paste comprising:
  a glass frit composition comprising $P_2O_5$ in an amount from about 40 to about 70 parts by weight, BaO, SrO or a mixture thereof in an amount from about 1 to about 20 parts by weight, ZnO in an amount from about 1 to about 30 parts by weight and $Al_2O_3$ in an amount from about 1 to about 15 parts by weight,
  a filler, and
  a photosensitive organic material
  wherein the reflective index of the glass frit composition is from about 1.5 to about 1.6 and
  wherein the reflective index of the photosensitive organic material is from about 1.5 to about 1.6.

In some embodiments, the glass frit composition is substantially free of Pb or Bi.

In some embodiments, the glass frit composition further comprises an alkali-based metal oxide selected from the group consisting of $Li_2O$, $Na_2O$ and $K_2O$, wherein the alkali-based metal oxide is about 3 parts by weight or less.

In some embodiments, the class frit composition further comprises $B_2O_3$ in an amount from about 1 to about 15 parts by weight.

In some embodiments, the glass frit composition further comprises $SiO_2$ in an amount about 5 parts by weight or less.

In some embodiments, wherein the thermal expansion coefficient of the glass frit composition is from about $70\times10^{-7}/°$ C. to about $85\times10^{-7}/°$ C.

Some embodiments relate to a plasma display panel comprising;
  barrier ribs comprising:
  a glass frit composition comprising $P_2O_5$ in an amount from about 40 to about 70 parts by weight, BaO, SrO or a mixture thereof in an amount from about 1 to about 20 parts by weight, ZnO in an amount from about 1 to about 30 parts by weight and $Al_2O_3$ in an amount from about 1 to about 15 parts by weight,
  wherein the reflective index of the glass frit composition is from about 1.5 to about 1.6.

In some embodiments, the glass frit composition is substantially free of Pb or Bi.

In some embodiments, the glass frit further comprises an alkali-based metal oxide selected from the group consisting of $Li_2O$, $Na_2O$ and $K_2O$, wherein the alkali-based metal oxide is about 3 parts by weight or less.

In some embodiments, the glass frit further comprises $B_2O_3$ in an amount from about 1 to about 15 parts by weight.

In some embodiments, the glass frit further comprises $SiO_2$ in an amount from about 0 to about 5 parts by weight Some embodiments relate to a method of making a plasma display panel comprising the steps of: providing a substrate, applying the photosensitive barrier rib paste material of Claim 13 to the substrate, and developing the paste material using photolithography.

BRIEF DESCRIPTION OF THE DRAWINGS

The above and other features and advantages of the present embodiments will become more apparent by describing in detail exemplary embodiments thereof with reference to the attached drawings in which.

DETAILED DESCRIPTION

Figure 1:
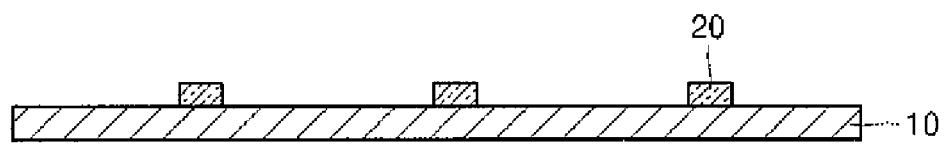
FIGS. 1-5 are sectional views for explaining a method of manufacturing PDP barrier ribs using a barrier-rib forming material according to an embodiment of the present inventive concept and a photolithographic process.

The present embodiments will now be described more fully with reference to the accompanying drawings, in which exemplary embodiments are shown.

The present embodiments provide a barrier-rib forming material that is environmentally friendly and can be used when barrier ribs are formed using a photolithographic process, barrier ribs formed using the barrier-rib forming material, and a plasma display panel (PDP) including the barrier ribs.

The present embodiments provide a glass frit composition having a similar refractive index to the photosensitive organic material, wherein the glass frit composition is used to form photosensitive barrier ribs. Specifically, to prevent light scattering in an exposure process, an average refractive index of the glass frit composition may be from about 1.5 to about 1.6.

Also, the present embodiments provide, as a barrier-rib forming material that is used in the photolithographic method, a barrier-rib forming material that is environmentally friendly because lead (Pb) and bismuth (Bi) are not included. Due to environmental problems, lead (Pb) is replaced with bismuth (Bi) for use in the glass frit composition that is a barrier-rib forming material. In this regard, when bismuth oxide ($Bi_2O_3$), which is a by-product of lead oxide (PbO), is used instead of lead oxide (PbO), the softening temperature or thermal expansion coefficient of glass frit can be easily controlled so that barrier ribs of amorphous glass can be stably formed. However, $Bi_2O_3$ is unstable in terms of price because $Bi_2O_3$ is produced in a very small amount. In addition, like PbO, $Bi_2O_3$ is harmful. Accordingly, there is a need to develop a glass frit composition that does not also include bismuth (Bi).

Conventionally, an alkali metal such as lithium (Li) is also used as a barrier-rib forming material that is used in a photolithographic process. Due to the alkali metal, the softening temperature and thermal expansion coefficient of the glass frit composition can be easily controlled and also the refractive index of the glass frit composition can be maintained at low levels so that the difference between the refractive index of the glass frit composition and the refractive index of the photosensitive organic material can be minimized. However, when the alkali metal is used too much, the barrier-rib becomes unstable and ion exchange reactions occur between barrier ribs/dielectric/glass substrate, thereby forming cracks in the glass substrate or causing a reaction between the barrier-rib forming material and a silver electrode and a yellowing phenomenon. Accordingly, the content of the alkali metal that is harmful for electronic components needs to be minimized.

As other physical characteristics required for use in the photolithographic method, the refractive index of the glass frit composition should be from about 1.5 to about 1.6 to prevent dispersion of light in the exposure process.

The present embodiments provide a glass frit composition that is a barrier-rib forming composition used in a photolithographic process. Specifically, the glass frit composition does not include lead (Pb) and bismuth (Bi) and thus, is environmentally friendly. Also, the content of an alkali metal contained in the glass frit composition is controlled as small as possible, so that a yellowing phenomenon driven by an ion exchange reaction caused by metal or cracks in a substrate can be prevented.

Also, the present embodiments provide barrier ribs formed using the glass frit composition and a PDP including the barrier ribs.

Photosensitive Barrier-Rib Forming Material

A glass frit composition according to an embodiment of the present inventive concept includes $P_2O_5$ as a primary component. In the present specification, the term "primary component" refers to a component that dominates the glass frit composition. In the glass frit composition, the content of $P_2O_5$ is from about 40 to about 70 parts by weight, the content of BaO, SrO or a mixture thereof is from about 1 to about 20 parts by weight), ZnO is from about 1 to about 30 parts by weight, and $Al_2O_3$ is from about 1 to about 15 parts by weight.

In the glass frit composition that is a barrier-rib forming material used in a photolithographic process, according to an embodiment of the present inventive concept, the content of $P_2O_5$ that is a primary component may be from about 40 to about 70 parts by weight. If the content of $P_2O_5$ is greater than 70 parts by weight, the glass frit composition is easily crystallized, and stable barrier ribs cannot be formed, and water-resistance characteristics may be degraded. On the other hand, if the content of $P_2O_5$ is less than 40 parts by weight, the softening temperature of the glass frit composition is increased and vitrification is difficult.

The glass frit composition includes from about 1 to about 20 parts by weight of BaO, SrO or a mixture thereof to widen a temperature range to be able to vitrify.

The glass frit composition includes 1 to 30 parts by weight of ZnO. ZnO maintains the melting point of the glass frit composition at low levels without a large change in the thermal expansion coefficient.

Due to inclusion of $Al_2O_3$, the glass frit composition has a wide vitrification range and high stability. The content of $Al_2O_3$ may be from about 1 to about 15 parts by weight.

The glass frit composition according to an embodiment of the present inventive concept may further include an alkali-based metal oxide, such as $Li_2O$, $Na_2O$, or $K_2O$. In this regard, the content of the alkali-based metal oxide may be about 3 parts by weight or less.

When the glass frit composition includes the alkali-based metal oxide, the glass transition temperature or softening temperature of the glass frit composition may be lowered so that the sintering process can be performed at a temperature of about 600° C. or lower. Accordingly, the glass frit composition includes at least 0 parts by weight of the alkali-based metal oxide.

The glass frit composition may further include from about 1 to about 15 parts by weight of B2O3 that does not include heavy metal such as lead (Pb) and contributes to a low melting point and a low refractive index.

The glass frit composition may further include no more than about 5 parts by weight of $SiO_2$ that is effective to decrease the refractive index. The content of $SiO_2$ may be 0 parts by weight to 5 parts by weight.

A glass frit composition including the components described above in the composition ration described above may have the glass transition temperature of from about 450° C. to about 500° C.

The thermal expansion coefficient of the glass frit composition may be $70 \times 10^{-7}$/° C. to $85 \times 10^{-7}$/° C. If the thermal expansion coefficient of the glass frit composition is outside this range, the difference between the thermal expansion coefficient of the glass frit composition and the thermal expansion coefficient of a glass substrate causes stress and thus, the glass substrate may have cracks when heating and cooling operations are performed.

The refractive index of the glass frit composition is similar to that of the photosensitive organic material in the exposure process. Specifically, the refractive index of the glass frit composition may be from about 1.5 to about 1.6. Accordingly, the exposure process can be effectively performed on the desired region.

Also, when barrier ribs are formed using the glass frit composition, a phenomenon in which transparency of the glass is degraded due to formation of crystal therein can be prevented.

In addition, by minimizing the content of alkali metal, ion exchange reaction between alkali metal and other metal can also be minimized and thus, cracks in barrier ribs, a dielectric layer contacting the barrier ribs, and a substrate and a yellowing phenomenon can be prevented and preservation characteristics of the paste for forming barrier ribs can be improved.

Preparation of Photosensitive Barrier-Rib Forming Paste

The glass frit composition according to the present inventive concept, filler having a high melting point, and a photosensitive organic material are mixed to form a photosensitive barrier-rib forming paste.

The filler having a high melting point may be a material having the softening temperature of 600□ or more, such as glass having a high melting point or a ceramic material such as cordierite. The content of the filler having a high melting point may be from about 5 to about 20 parts by weight based on 100 parts by weight of the glass frit composition.

The photosensitive organic material may include a crosslinking agent such as a polyfunctional monomer or olimer, a photo initiator, a binder, and an additive.

The photo initiator may be any compound that generates radicals in a photolithographic method and initiates a crosslinking reaction of the crosslinking agent. Examples of the photo initiator include benzophenone, 4,4-bis(dimethylamino)benzophenone, 4,4-bis(diethylamino)benzophenone, 2,2-diethoxyacetophenone, 2,2-dimethoxy-2-phenylacetophenone, 2-methyl-[4-(methylthio)phenyl]-2-morpholinopropane-1-on, 2-benzyl-2-dimethylamino-1-(4-morpholinophenyl)-1-butanone, bis(2,6-dimethoxybenzoyl)-2,4,4-trimethylpentylphosphineoxide, bis 2,4,6-trimethylbenzoyl phenylphosphineoxide, and combinations of at least two materials selected from the forgoing or at least one material selected from the forgoing with one that does not described the forgoing.

The content of the photo initiator may be from about 0.5 to about 5 parts by weight based on 100 parts by weight of the glass frit composition. If the content of the photo initiator is less than 0.5 parts by weight based on 100 parts by weight of the glass frit composition, photolithography sensitivity is degraded, On the other hand, if the content of the photo initiator is greater than 5 parts by weight based on 100 parts by weight of the glass frit composition, a line width of an exposed portion is small or an unexposed portion may not be developed and thus, an accurate electrode pattern cannot be obtained.

The crosslinking agent may be any compound that can participate in a radical polymerization reaction initiated by the photo initiator. The crosslinking agent may be, for example, a single-functional or multi-functional monomer. Specifically, use of the multi-functional monomer is desirable to improve exposure sensitivity. Examples of the multi-functional monomer include: diacrylates, such as ethyleneglycoldiacrylate (EGDA); triacrylates, such as trimethylolpropantriacrylate (TMPTA), trimethylolpropanethoxyratetriacrylate (TMPEOTA), or pentaerythritoltriacrylate; tetraacrylates, such as tetramethylolpropantetraacrylate or pentaerythritoltetraacrylate; hexaacrylates such as dipentaerisritolhexaacrylate (DPHA); and combinations of at least two materials selected from the forgoing or at least one material selected from the forgoing with one that does not described the forgoing.

The amount of the crosslinking agent may be from about 5 to about 30 parts by weight based on 100 parts by weight of the glass frit composition. If the content of the crosslinking agent is less than 5 parts by weight based on 100 parts by weight of the glass frit composition, photolithography sensitivity is degraded in the exposure process, and a uniform barrier-rib pattern cannot be obtained in a development process. On the other hand, if the content of the crosslinking agent is greater than 30 parts by weight based on 100 parts by weight of the glass frit composition, the width of barrier ribs is increased after the development process and the desired barrier-rib pattern cannot be obtained.

The binder may be a polymer that is crosslinked by the photo initiator and easily removed to form a barrier-rib pattern in the development process. Also, the binder enhances an adhesive force between barrier ribs and a substrate and/or a dielectric layer. The binder may be an acryl resin, a styrene resin, a novolac resin, a polyester resin, or a combination thereof. Specifically, examples of the binder include monomers containing a carboxyl group, monomers containing a hydroxyl group, and polymerizable monomers. Examples of the monomers containing a carboxyl group include acetate, metacetate, fumaric acid, crotonic acid, itaconic acid, citraconic acid, mesaconic acid, cinnamic acid, succinic acid mono(2-(meth)acryloyloxyethyl)ester, ω-carboxy-polycaprolactonemono(meth)acrylate, and so forth. Examples of the monomers containing a hydroxyl group include: a hydroxyl group-containing monomers such as (meth)acetate 2-hydroxyethyl, (met)acetate2-hydroxypropyl, or (met)acetate3-hydroxypropyl; and a phenolic hydroxyl group-containing monomers such as o-hydroxystyrene, m-hydroxystyrene, or p-hydroxystyrene. Examples of the polymerizable monomers include (met)acetate esters, such as (met)acetatemethyl, (met)acetateethyl, (met)acetate n-butyl, (met)acetate n-lauryl, (met)acetate benzyl, glycidyl(met)acrylate, dicycloropentanyl(met)acrylate, etc.; aromatic vinyl monomers such as styrene, α-methyl styrene, etc.; conjugated dienes such as butadiene, isoprene, etc.; and macromonomers having (met)acryloyl group, which is a polymerization unsaturated group, at an end of a polymerization chain, such as polystyrene, poly(met)acetatemethyl, poly(met)acetateethyl, poly(met)acetate benzyl, etc.

The content of the binder may be from about 5 to about 50 parts by weight based on 100 parts by weight of the glass frit composition. If the content of the binder is less than 5 parts by weight based on 100 parts by weight of the glass frit composition, the glass frit composition may be easily separated from a substrate and/or a dielectric layer in the drying and exposure/development processes. On the other hand, if the content of the binder is greater than 50 parts by weight based on 100 parts by weight of the glass frit composition, the development process may be inefficiently performed.

Also, the photosensitive organic material further includes a solvent as the additive. The solvent may be an organic or inorganic solvent that is commonly used in the art. Examples of the solvent include ketones, alcohols, ether-based alcohols, alkyl esters of saturated aliphatic monocarboxylic acid, lactic acid esters, ether-based esters, and combinations thereof. Examples of other additives include a sensitizer that improves sensitivity, a polymerization inhibitor and an antioxidant that improve preservation properties of the photolithographic barrier-rib forming paste, a UV absorber that improves resolution, an anti-foaming agent that reduces formation of bubbles in the photolithographic barrier-rib forming paste, a leveling agent that improves planarization properties of a printed film, or a plasticizer that imposes thixotropic properties. However, these additives may be optionally used, and when used, the amounts of the additives may be appropriately adjusted in consideration of the amounts of the additives that are generally used in the art.

The glass frit composition, the filler having a high melting point, and the photosensitive organic material are mixed to prepare a photosensitive barrier-rib forming paste.

Formation of PDP Barrier Ribs

A method of forming PDP barrier ribs using a barrier-rib forming material according to an embodiment of the present inventive concept and a photolithographic process will now be described with reference to FIGS. 1-5.

Referring to FIG. 1, a substrate 10 is prepared and a paste for forming an electrode is applied on the substrate 10. Then, a photolithographic process is used to expose and develop the paste for forming an electrode, thereby forming a plurality of electrodes 20 which are parallel to each other.

Figure 2:
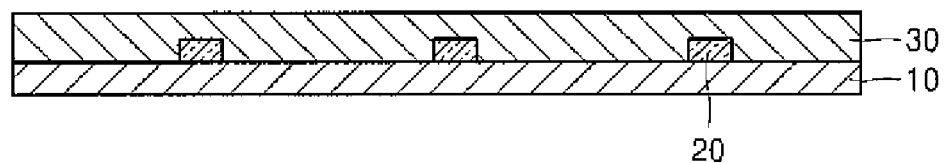

Referring to FIG. 2, a dielectric layer 30 covers the electrodes 20 on the substrate 10. The dielectric layer 30 is formed by applying glass powder for forming a dielectric layer and drying the applied glass powder. In some cases, the glass powder for forming a dielectric layer may be dried and then sintered before barrier ribs are formed. In other cases, the glass powder for forming a dielectric layer may be sintered together with barrier ribs.

Referring to FIG. 2, the electrode 20 on the substrate is coated with a first paste 30 for forming the dielectric layer and dried. The first paste 30 for forming the dielectric layer may include glass powder for the dielectric layer.

Figure 3:
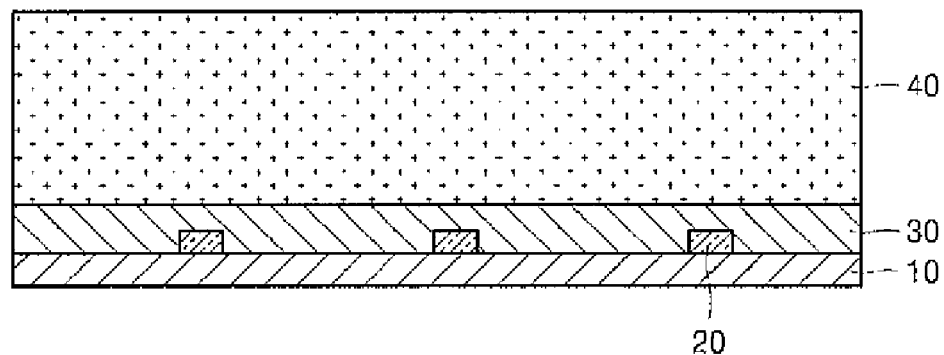

Referring to FIG. 3, a second paste 40 for the barrier-rib is applied on the first paste 30 for forming the dielectric layer and then dried. The second paste 40 may be prepared by mixing the glass frit composition described above, filler having a high melting point, and a photosensitive organic material. The glass frit composition includes from about 40 to about 70 parts by weight of $P_2O_5$, from about 1 to about 20 parts by weight of BaO, SrO or the mixture thereof, from about 1 to about 30 parts by weight of ZnO, and from about 1 to about 15 parts by weight of $Al_2O_3$. The glass frit composition may further include no more than about 3 parts by weight of an alkali-based metal oxide, such as $Li_2O$, $Na_2O$, or $K_2O$. The glass frit composition may further include from about 1 to about 15 parts by weight of $B_2O_3$. The glass frit composition may further include no more than from about 5 parts by weight of $SiO_2$.

Figure 4:
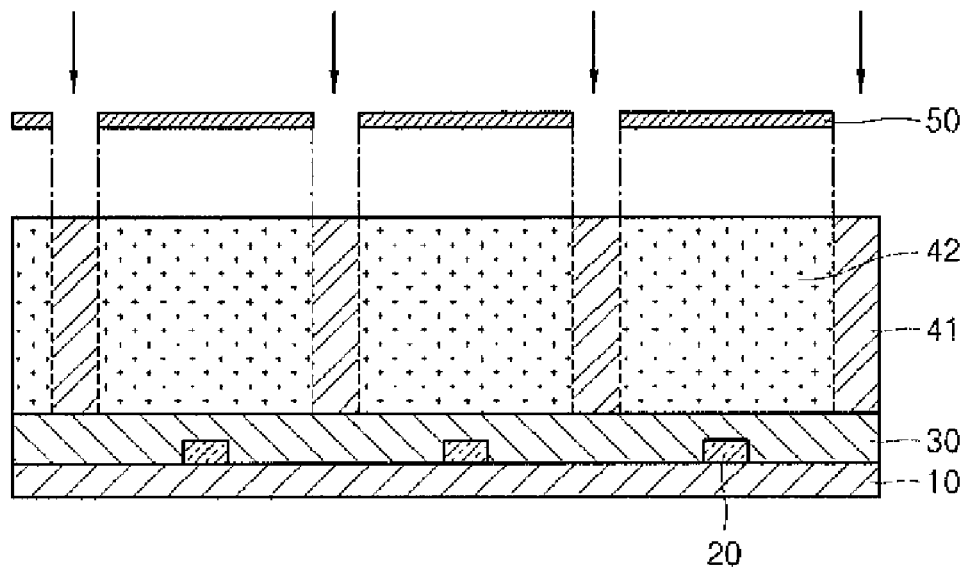

Referring to FIG. 4, the second paste (40 of FIG. 3) is selectively exposed to light through a photomask 50. Accordingly, the second paste (40 of FIG. 3) is divided into an exposed portion 41 and an unexposed portion 42. The exposed portion 41 is hardened because the crosslinking agent and the binder perform a polymerization reaction when exposed to light. On the other hand, the unexposed portion 42 is relatively easily dissolved by a developing solution.

Figure 5:
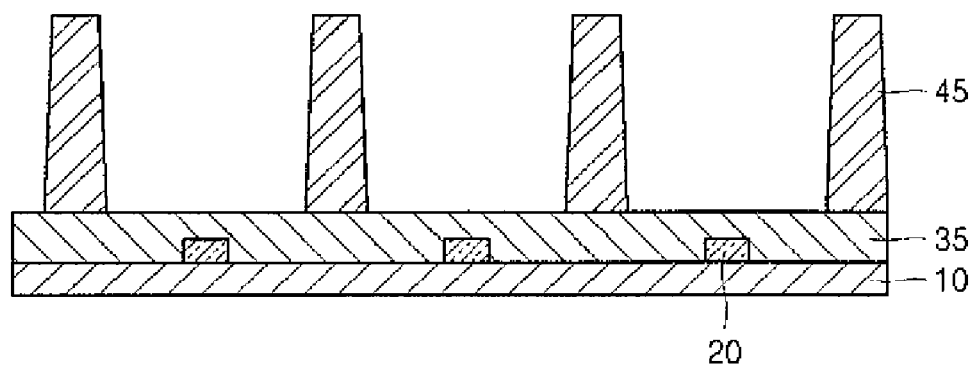

Referring to FIG. 5, after the exposure, the second paste (40 of FIG. 3) is developed with the developing solution. In this regard, the developing solution may be an alkali solution. The alkali solution may be an amine compound, such as ethanol amine or diethanol amine.

Accordingly, an exposed region (41 of FIG. 4) remains and an unexposed region (42 of FIG. 4) is removed. The second paste 40 of the exposed region (41 of FIG. 4) and the first paste 30 for the dielectric layer are simultaneously sintered. The sintering temperature may be about 600° C. or less. After the sintering process is completed, barrier ribs 45 and a dielectric layer 35 are formed. However, according to the type of the crosslinking agent, the binder, and the developing solution, the unexposed portion 42 may be formed to be barrier ribs.

PDP

Figure 6:
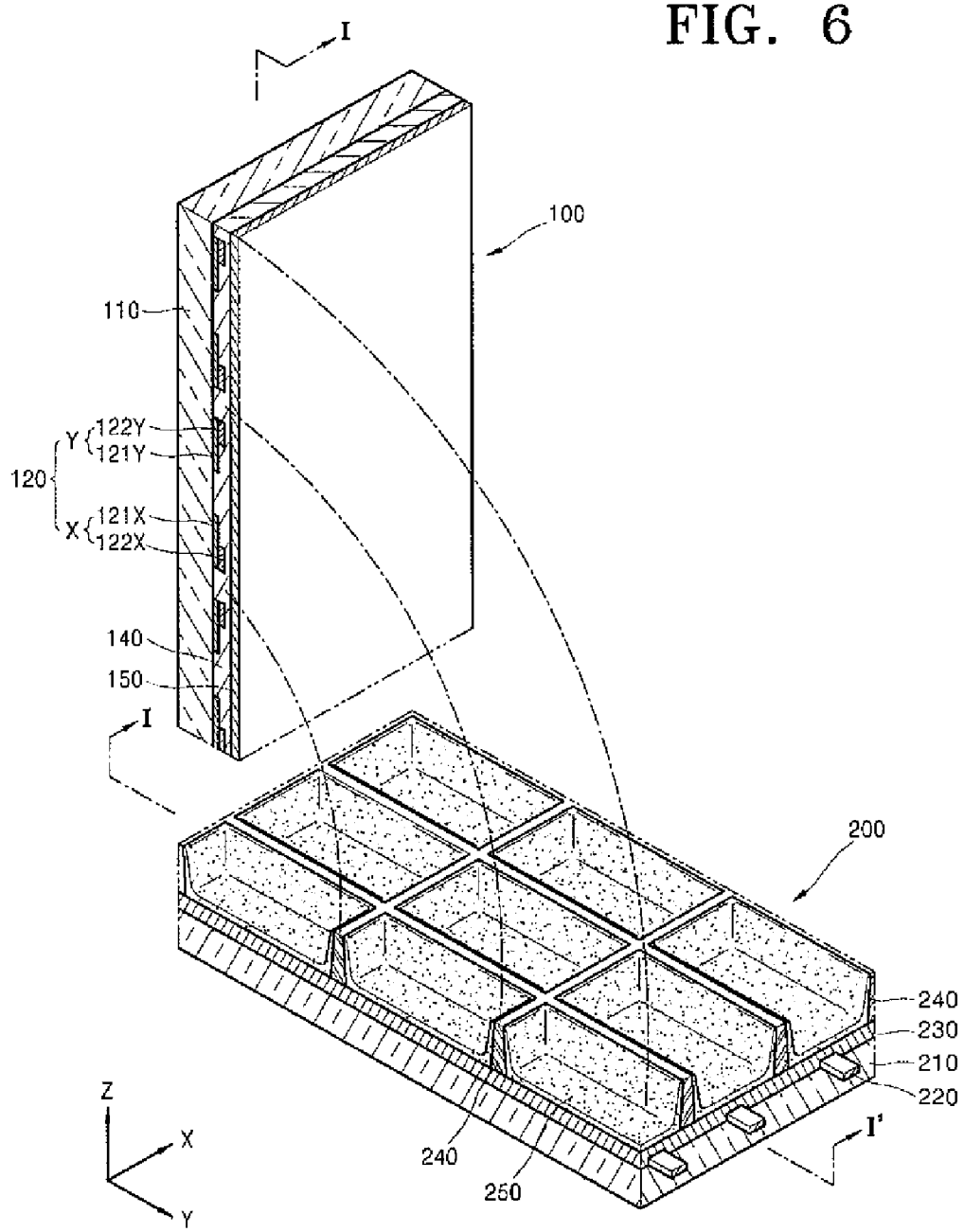
FIG. 6 is a exploded perspective view of a PDP including the PDP barrier ribs.

A PDP including barrier ribs formed using a barrier-rib forming material according to an embodiment of the present inventive concept will now be described in detail with reference to FIGS. 6 and 7. FIG. 6 is a exploded perspective view of a PDP including the PDP barrier ribs, and FIG. 7 is a sectional view taken along a line I-I' of the PDP of FIG. 6.

Figure 7:
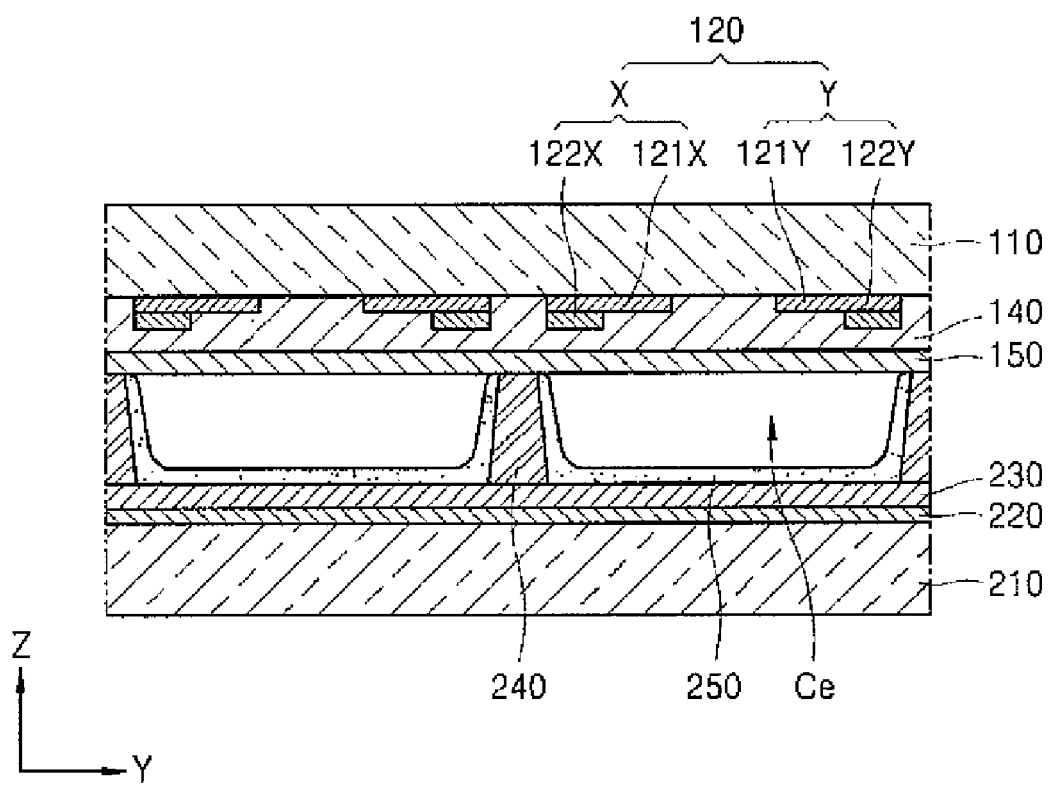
FIG. 7 is a sectional view taken along a line I-I' of the PDP of FIG. 6.

Referring to FIGS. 6 and 7, the PDP includes a top panel 100 through which light is emitted to the outside and a bottom panel 200 that includes a phosphor for emitting light.

The top panel 100 will now be described in detail. A plurality of discharge electrode pairs 120 extend along a first substrate 110 and are parallel to each other. Each discharge electrode pair 120 includes a sustain electrode X and a scan electrode Y. The sustain electrode X includes a transparent electrode 121X and a bus electrode 122X, and the scan electrode Y includes a transparent electrode 121Y and a bus electrode 122Y. The bus electrodes 122X and 122Y extend in an X direction. The transparent electrodes 121X and 121Y protrudes over bus electrodes 122X and 122Y in a Y direction or −Y direction. However, the structure of the discharge electrode pairs 12 is not limited thereto, and the discharge electrode pairs 12 may have various structures.

Then, the sustain electrode X and the scan electrode Y are covered by a first dielectric layer 140 and a protection layer 150 which are sequentially formed on the first substrate 110 in this order. The protection layer 150 is a polycrystalline thin film formed of magnesium oxide. The protection layer 150 protects the first dielectric layer 140 from colliding with charge particles and also emits secondary electrons when plasma is discharged, thereby contributing to a decrease in a discharge initiation voltage and discharge sustain voltage.

A bottom panel 200 will now be described. A plurality of address electrodes 220 extend along a second substrate 210 in the Y direction. The address electrode 220 is covered by a second dielectric layer 230, and barrier ribs 240 define a plurality of discharge cells Ce in a discharge space.

The barrier ribs 240 may be formed using a paste including the glass frit composition described above and a photolithographic process. Specifically, the paste including the glass frit composition described above is prepared, the paste is applied and dried, and then the photolithographic process is performed on the dried paste.

The discharge cells Ce are filled with a discharge gas that is an ultraviolet (UV) rays generating source. The discharge gas may be a gas that emits appropriate UV rays through discharge excitation. For example, the discharge gas may be a gaseous mixture of xenon (Xe), krypton (Kr), helium (He), and neon (Ne) in a predetermined volume ratio.

A phosphor layer 250 is disposed inside each discharge cell Ce. The phosphor layer 250 is disposed on side walls of barrier ribs 240 and the second dielectric layer 230. Specifically, the discharge cells Ce may include different phosphor layers 250, such as a red phosphor layer, a green phosphor layer, and a blue phosphor layer.

The present embodiments will be described in further detail with reference to the following examples. These examples are for illustrative purposes only and are not intended to limit the scope of the present embodiments.

Examples 1 to 7

Metal oxides shown in Table 1 were mixed in the corresponding composition ratio shown in Table 1. The mixture was placed in a platinum crucible and dissolved in an electric furnace at a temperature of 1100° C. to 1300° C. The dissolved glass water was poured to a space formed between metal rollers to form a thin glass ribbon. The thin glass ribbon was reduced to a powder having an appropriate particle size through first and second ball milling processes, thereby forming a glass frit composition.

TABLE 1

| | Example | | | | | | |
|---|---|---|---|---|---|---|---|
| | 1 (weight %) | 2 (weight %) | 3 (weight %) | 4 (weight %) | 5 (weight %) | 6 (weight %) | 7 (weight %) |
| $Li_2O$ | | | | 0.5 | | 0.5 | 0.5 |
| $Na_2O$ | | | | 0.5 | 0.5 | | 0.5 |
| $K_2O$ | | | | | 0.5 | 0.5 | |
| BaO | 11 | 12 | 11 | 15 | 6 | | 7 |
| SrO | | | | | 2 | 10 | 3 |
| ZnO | 23 | 20 | 22 | 18 | 24 | 22 | 22 |
| $Al_2O_3$ | 3 | 2 | 3 | 4 | 3 | 2 | 4 |
| $B_2O_3$ | | | | 2 | 3 | 1 | 2 |
| $SiO_2$ | | | | 2 | 0.5 | 1 | 1 |
| $P_2O_5$ | 63 | 66 | 64 | 58 | 60.5 | 63 | 60 |

Comparative Examples 1 to 5

A glass frit composition was prepared in the same manner as in Examples 1 to 7, except that the metal oxides and composition ratios shown in Table 2 were used.

TABLE 2

| | Comparative Example | | | | |
|---|---|---|---|---|---|
| | 1 (weight %) | 2 (weight %) | 3 (weight %) | 4 (weight %) | 5 (weight %) |
| $Li_2O$ | 7.0 | 8 | 9 | 3 | |
| $Na_2O$ | | 1 | | | |
| CaO | 6.3 | 6 | 4 | | |
| MgO | 4.1 | | 6 | | |
| BaO | 2.1 | 5 | 4 | 17 | 14 |
| SrO | 2.0 | | | | |
| ZnO | 2.2 | 2 | 2 | | 23 |
| $Al_2O_3$ | 20.9 | 14 | 24 | 3 | 4 |
| $B_2O_3$ | 33.3 | 36 | 31 | 44 | 18 |
| $Bi_2O_3$ | | | | 26 | 28 |
| $ZrO_2$ | | 3 | | | |
| $SiO_2$ | 22.1 | 25 | 20 | 7 | 13 |

Evaluation Example 1

Thermal characteristics of the glass frit compositions prepared according to Examples 1-7 and Comparative Examples 1-5 were evaluated.

Metal oxides shown in Tables 1 and 2 were mixed in the corresponding composition shown in Tables 1 and 2. The mixture was placed in a platinum crucible and dissolved in an electric furnace at a temperature of 1100° C. to 1300° C. The dissolved glass water was poured to a space formed between metal rollers to form a thin glass ribbon. The thin glass ribbon was reduced to a powder having an appropriate particle size through first and second ball milling processes, thereby forming a glass frit composition. The glass transition temperature (Tg) and the softening temperature (Ts) of the glass frit composition were measured by using a Differential Scanning Calorimeter (DSC).

In addition, each of the glass frit compositions prepared with reference to Tables 1 and 2 was mixed with 5-30 parts by weight of filler having a high melting point such as cordierite and then the mixture was sintered. The sintered product was cut to a predetermined size. The obtained sample was heated while increasing the temperature to 300° C. At this time, a change in length of the sample per minute was measured and a thermal expansion coefficient (CTE) was measured. The results are shown in Tables 3 and 4. Table 3 shows the glass transition temperatures, softening temperatures, and thermal expansion coefficients of the glass frit compositions prepared according to Examples 1-7, and Table 4 shows the glass transition temperatures, softening temperatures, and thermal expansion coefficients of the glass frit compositions prepared according to Comparative Examples 1-5.

TABLE 3

| | Example | | | | | | |
|---|---|---|---|---|---|---|---|
| | 1 | 2 | 3 | 4 | 5 | 6 | 7 |
| Tg (° C.) | 480 | 476 | 474 | 465 | 451 | 462 | 471 |
| Ts (° C.) | 533 | 532 | 531 | 524 | 517 | 537 | 522 |
| CTE (×$10^{-7}$/° C.) | 71.2 | 71.5 | 74.5 | 73.5 | 74.2 | 75.1 | 73.3 |

TABLE 4

| | Comparative Example | | | | |
|---|---|---|---|---|---|
| | 1 | 2 | 3 | 4 | 5 |
| Tg (° C.) | 498 | | 480 | | |
| Ts (° C.) | 531 | 515 | 520 | 533 | 538 |
| CTE (×10⁻⁷/° C.) | 74 | | 79 | | |

Comparative Examples 1-5 in which the content of alkali metal oxide was greater than 3 parts by weight or 3 parts by weight or less and bismuth (Bi) was used, had the glass transition temperature of 480° C. to 498° C., the softening temperature of 515° C. to 538° C., and the thermal expansion coefficient of $74 \times 10^{-7}/°$ C. to $79 \times 10^{-7}/°$ C.

However, referring to Table 3, the glass frit compositions prepared according to Examples 1-7 in which the content of alkali metal oxide was 3 parts by weight or less and bismuth (Bi) was not used, had the glass transition temperature of 451° C. to 480° C., the softening temperature of 517° C. to 537° C. and the thermal expansion coefficient of $71.2 \times 10^{-7}/°$ C. to $75.1 \times 10^{-7}/°$ C. which are appropriate for forming photosensitive barrier ribs.

Accordingly, it is identified that glass frit compositions prepared according to Examples 1-7 had the glass transition temperature, softening temperature, and thermal expansion coefficients suitable for forming photosensitive barrier ribs, although these glass frit compositions did not use bismuth (Bi) and included 3 parts by weight or less of alkali metal.

Evaluation Example 2

This experiment was performed to evaluate optical characteristics of the glass frit compositions, that is, the refractive index of the glass frit compositions.

Metal oxides shown in Tables 1 and 2 were mixed in the corresponding composition ratio shown in Tables 1 and 2. The mixture was dissolved at a temperature of 1100° C. to 1300° C. and poured on a graphite substrate to form a glass lump. Then, the glass lump was processed to form a sample having a predetermined size. The refractive index of the sample was measured using an Abbe refractometer.

The results are shown in Tables 5 and 6.

TABLE 5

| | Example | | | | | | |
|---|---|---|---|---|---|---|---|
| | 1 | 2 | 3 | 4 | 5 | 6 | 7 |
| Refractive index | 1.54 | 1.57 | 1.55 | 1.52 | 1.55 | 1.58 | 1.54 |

TABLE 6

| | Comparative Example | | | | |
|---|---|---|---|---|---|
| | 1 | 2 | 3 | 4 | 5 |
| Refractive index | 1.58 | 1.58 | 1.58 | 1.68 | 1.73 |

The glass frit compositions prepared according to Examples 1-7 had lower refractive index than the glass frit compositions prepared according to Comparative Examples 1-5. Like a photosensitive organic material, the refraction indices of the glass frit compositions prepared according to Examples 1-7 were 1.5 to 1.6. Since the refraction indexes of the glass frit compositions prepared according to Examples 1-7 were equal to or similar to that of the photosensitive organic material, the glass frit compositions prepared according to Examples 1-7 can be effectively used as a barrier-rib forming material that is used in a photolithographic process.

While the present embodiments have been particularly shown and described with reference to exemplary embodiments thereof, it will be understood by those of ordinary skill in the art that various changes in form and details may be made therein without departing from the spirit and scope of the present embodiments as defined by the following claims.

What is claimed is:

1. A glass frit composition comprising $P_2O_5$ in an amount from about 40 to about 70 parts by weight, SrO in an amount from about 1 to about 20 parts by weight, ZnO in an amount from about 1 to about 30 parts by weight and $Al_2O_3$ in an amount from about 1 to about 15 parts by weight, and an alkali-based metal oxide selected from the group consisting of $Li_2O$, $Na_2O$ and $K_2O$, in an amount of 3 parts by weight or less,
   wherein the glass frit composition is a composition for forming a photosensitive barrier rib.

2. The glass frit composition of claim 1, wherein the average light refractive index of the composition is from about 1.5 to about 1.6.

3. The glass frit composition of claim 1, wherein the glass frit composition is a composition for forming a photosensitive barrier rib.

4. The glass frit composition of claim 1, wherein the composition is substantially free of Pb or Bi.

5. The glass frit composition of claim 1, wherein the composition further comprises $B_2O_3$ in an amount from about 1 to about 15 parts by weight.

6. The glass frit composition of claim 1, wherein the composition further comprises $SiO_2$ in an amount about 5 parts by weight or less.

7. The glass frit composition of claim 1, wherein the thermal expansion coefficient of the composition is from about $70 \times 10^{-7}/°$ C. to about $85 \times 10^{-7}/°$ C.

8. A photosensitive barrier rib paste comprising:
   a glass frit composition comprising $P_2O_5$ in an amount from about 40 to about 70 parts by weight, SrO in an amount from about 1 to about 20 parts by weight, ZnO in an amount from about 1 to about 30 parts by weight and $Al_2O_3$ in an amount from about 1 to about 15 parts by weight,
   a filler, and
   a photosensitive organic material
   wherein the refractive index of the glass frit composition is from about 1.5 to about 1.6
   wherein the reflective index of the photosensitive organic material is from about 1.5 to about 1.6; and wherein the glass frit composition comprises an alkali-based metal oxide selected from the group consisting of $Li_2O$, $Na_2O$ and $K_2O$, wherein the alkali-based metal oxide is about 3 parts by weight or less.

9. The photosensitive barrier rib paste of claim 8, wherein the glass frit composition is substantially free of Pb or Bi.

10. The photosensitive barrier rib paste of claim 8, wherein the class frit composition further comprises $B_2O_3$ in an amount from about 1 to about 15 parts by weight.

11. The photosensitive barrier rib paste of claim 8, wherein the glass frit composition further comprises $SiO_2$ in an amount about 5 parts by weight or less.

12. A method of making a plasma display panel comprising the steps of:
   providing a substrate,
   applying the photosensitive barrier rib paste material of claim 11 to the substrate, and
   developing the paste material using photolithography.

13. The photosensitive barrier rib paste of claim 8, wherein the thermal expansion coefficient of the glass frit composition is from about $70 \times 10^{-7}/°$ C. to about $85 \times 10^{-7}/°$ C.

14. A plasma display panel comprising;
   barrier ribs comprising:
   a glass frit composition comprising $P_2O_5$ in an amount from about 40 to about 70 parts by weight, SrO in an amount from about 1 to about 20 parts by weight, ZnO in an amount from about 1 to about 30 parts by weight and $Al_2O_3$ in an amount from about 1 to about 15 parts by weight,
   wherein the refractive index of the glass frit composition is from about 1.5 to about 1.6; and
   wherein the glass frit composition comprises an alkali-based metal oxide selected from the group consisting of $Li_2O$, $Na_2O$ and $K_2O$, wherein the alkali-based metal oxide is about 3 parts by weight or less.

15. The plasma display panel of claim 14, wherein the glass frit composition is substantially free of Pb or Bi.

16. The plasma display panel of claim 14, wherein the glass frit composition further comprises $B_2O_3$ in an amount from about 1 to about 15 parts by weight.

17. The plasma display panel of claim 14, wherein the glass frit composition further comprises $SiO_2$ in an amount from about 0 to about 5 parts by weight.

* * * * *